No. 676,227. Patented June 11, 1901.
E. R. FELLOWS.
GEAR GENERATING MACHINE.
(Application filed June 26, 1899.)
(No Model.) 9 Sheets—Sheet 1.

No. 676,227. Patented June 11, 1901.
E. R. FELLOWS.
GEAR GENERATING MACHINE.
(Application filed June 26, 1899.)
(No Model.) 9 Sheets—Sheet 3.

Fig. 3.

WITNESSES:
INVENTOR:

No. 676,227. Patented June 11, 1901.
E. R. FELLOWS.
GEAR GENERATING MACHINE.
(Application filed June 26, 1899.)
(No Model.) 9 Sheets—Sheet 4.

WITNESSES. INVENTOR.

No. 676,227. Patented June 11, 1901.
E. R. FELLOWS.
GEAR GENERATING MACHINE.
(Application filed June 26, 1899.)

(No Model.) 9 Sheets—Sheet 5.

No. 676,227. Patented June 11, 1901.
E. R. FELLOWS.
GEAR GENERATING MACHINE.
(Application filed June 26, 1899.)
(No Model.) 9 Sheets—Sheet 6.

WITNESSES:
INVENTOR:
E. R. Fellows

Fig. 10.

No. 676,227. Patented June 11, 1901.
E. R. FELLOWS.
GEAR GENERATING MACHINE.
(Application filed June 26, 1899.)
(No Model.) 9 Sheets—Sheet 9.

WITNESSES:

INVENTOR:
E. R. Fellows

UNITED STATES PATENT OFFICE.

EDWIN R. FELLOWS, OF SPRINGFIELD, VERMONT.

GEAR-GENERATING MACHINE.

SPECIFICATION forming part of Letters Patent No. 676,227, dated June 11, 1901.

Application filed June 26, 1899. Serial No. 721,832. (No model.)

*To all whom it may concern:*

Be it known that I, EDWIN R. FELLOWS, of Springfield, in the county of Windsor and State of Vermont, have invented certain new and useful Improvements in Gear-Generating Machines, of which the following is a specification.

This invention relates to machines for generating curves of gear-teeth upon gear and rack blanks by means of a metal-planing cutter having a circular series of radiating or outwardly-projecting gear-shaped metal-planing teeth, which cutter coöperates with a blank holder or support, means for reciprocating one of said parts to cause the cutter to plane the blank, and means for changing the relative positions of said parts to cause the teeth to act successively at different points on the blank and generate the curves of gear-teeth thereon, a type of said machine being shown in Letters Patent of the United States No. 579,708, granted to me March 30, 1897.

The present invention has for its object to provide certain improvements relating to a machine of this character, chief among which improvements is the provision of means for giving one of the said parts above referred to, as the cutter and the blank, a movement of engagement with and clearance from the other part on a line which is oblique to or at an angle with a line connecting the axes of the cutter and the blank, to the end that after the movement of clearance and during the return stroke, which brings the cutter into position to again act on the blank, there shall be no contact between the cutter and blank.

In the drawings accompanying this application I have illustrated and in the following specification have described a machine provided with means for effecting the above-described movement of engagement and clearance, the said machine embodying other improvements which will be hereinafter described in detail, and pointed out in the claims.

Fig. 4 represents a section on line 4 4 of Fig. 1.
Fig. 6 represents a section on line 6 6 of Fig. 1.
Fig. 6ª represents a section similar to Fig. 6, showing a different position of the work-holder.
Fig. 7 represents a plan view of the cutter and blank, showing the direction of movement of the blank in engaging it with and removing it from the cutter.
Figs. 8 and 9 represent diagrammatic views illustrating the plungers and trundle-rolls, hereinafter referred to.
Fig. 11 represents a section on line 11 11, Fig. 1.
Fig. 12 represents a section on line 12 12, Fig. 2.
Fig. 13 represents a view similar to a portion of Fig. 12, showing some of the parts in a different position.
Fig. 14 represents a section on line 14 14, Fig. 12.
Fig. 15 represents a section on line 15 15, Fig. 12.

The same reference characters indicate the same parts in all the figures.

In the drawings, *a* represents the supporting-frame, which is provided with means for supporting and progressively moving a blank *b* on which gear-teeth are to be cut, and *c* represents the gear-shaped cutter, which is a gear-shaped body of hardened steel having a series of alternating projections and recesses, the said projections constituting a series of metal-planing teeth. In the machine here shown the cutter is movable forward and back across the plane of the blank and is rotated in unison with the blank, the result being the formation of gear-teeth on the blank, as described in the above-mentioned Letters Patent.

Figures 4, 5, 8, 9:
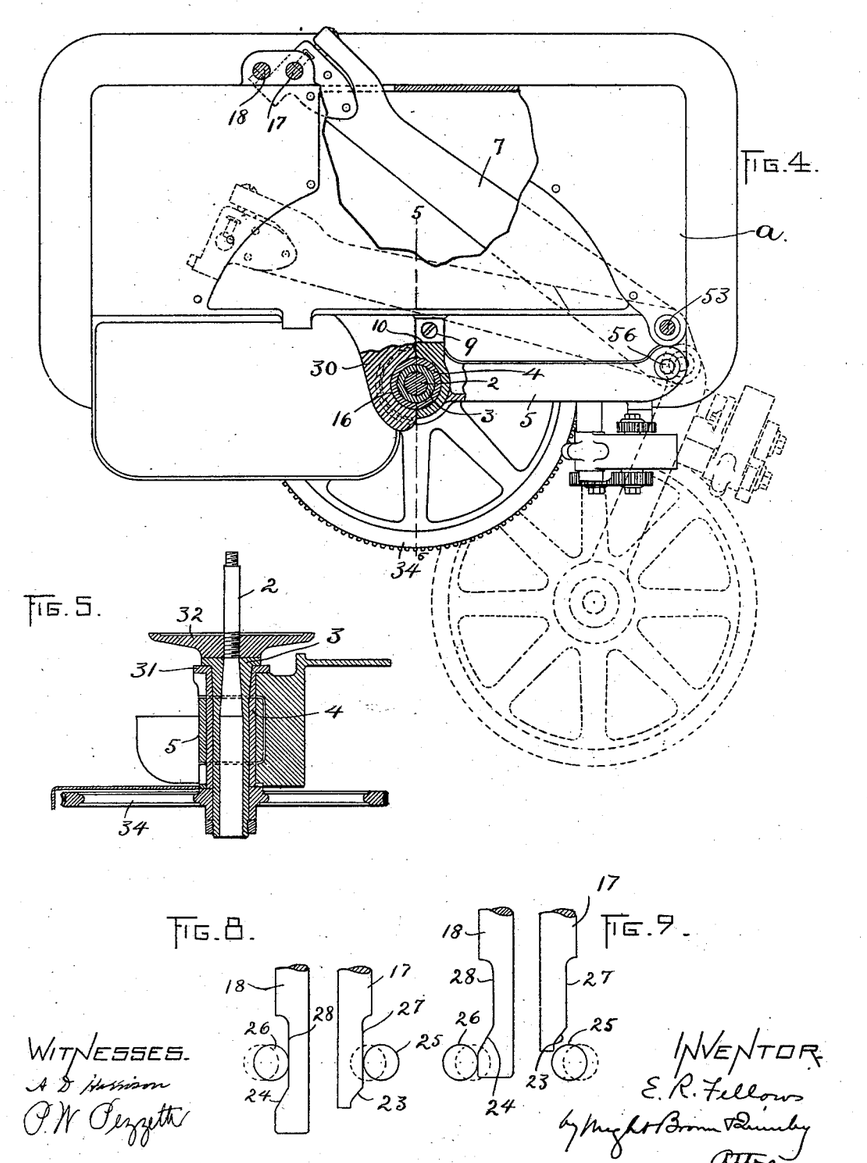
Figure 5:
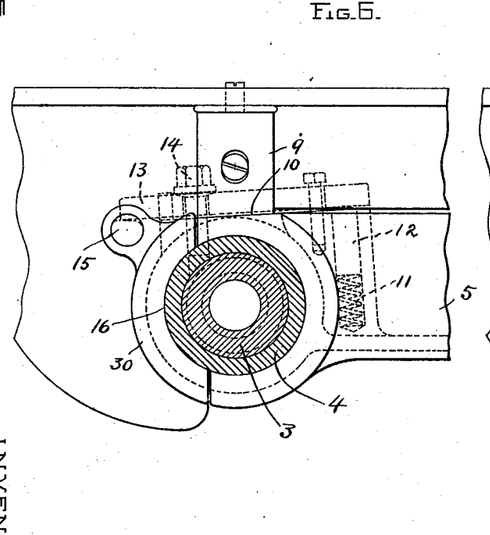
Fig. 5 represents a section on line 5 5 of Fig. 4.
Figure 5A:
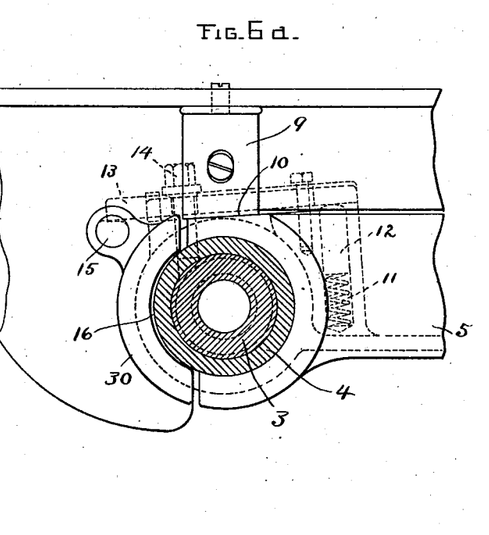

The blank *b* is secured to an arbor 2, which is affixed to a work-spindle 3, rotating in a quill or bearing 4 in a carrier 5, here shown as a swinging arm or apron. Said carrier in this embodiment of my invention is pivoted at 56 to the shorter arm of a two-armed lever 7, Fig. 4, which is fulcrumed at 53 to the supporting-frame, its longer arm being engaged by mechanism hereinafter described, which imparts to the lever a short oscillating movement, causing the carrier to move longitudinally and move the work toward and from the cutter c, these movements being timed to present the work to the cutter before the cutting movement of the latter and withdraw the work during the return movement of the cutter, so that the cutter will properly engage and clear the work. This movement of engagement and clearance is relatively short, about one thirty-second of an inch being sufficient. An important part of my invention is the provision of means for giving said movement a direction which is oblique or at an angle to a line $x\ x$, Fig. 7, connecting the axes of the cutter and the work, the line $x'\ x'$ indicating the line of movement of the work toward and from the cutter. This movement is determined in this case by a hardened-steel guide-plate 9, Fig. 6, affixed to the supporting-frame and having an oblique outer edge 10, which corresponds to the line $x'\ x'$, the work-carrier bearing on said oblique edge. The object of this oblique movement is to avoid contact between the acting teeth of the cutter and the work during the return movement of the cutter and while the work is withdrawn therefrom. The carrier is held against the guide-plate 9 during its backward movement by spring-pressure produced by the means shown in Figs. 6 and 6ª, said means including a spring 11, located in a cavity in the carrier, a stud 12, movable in said cavity and pressed outwardly therefrom by the spring, and a lever 13, connected with the carrier, so as to move therewith, and adapted to swing independently on the rounded inner face of a bolt 14, which is screwed into the carrier and passes through a hole in the lever. The spring-pressed pin bears against the lever near one of its ends, the other end bearing and having a sliding movement on a fulcrum 15, affixed to the abutment 16, hereinafter described. The pressure of the spring against the lever causes the latter, through the bolt 14, to pull the carrier toward the guide-plate, thus maintaining a close contact between said parts during the backward movement of the carrier, the lever sliding freely on the fulcrum.

Figure 1:
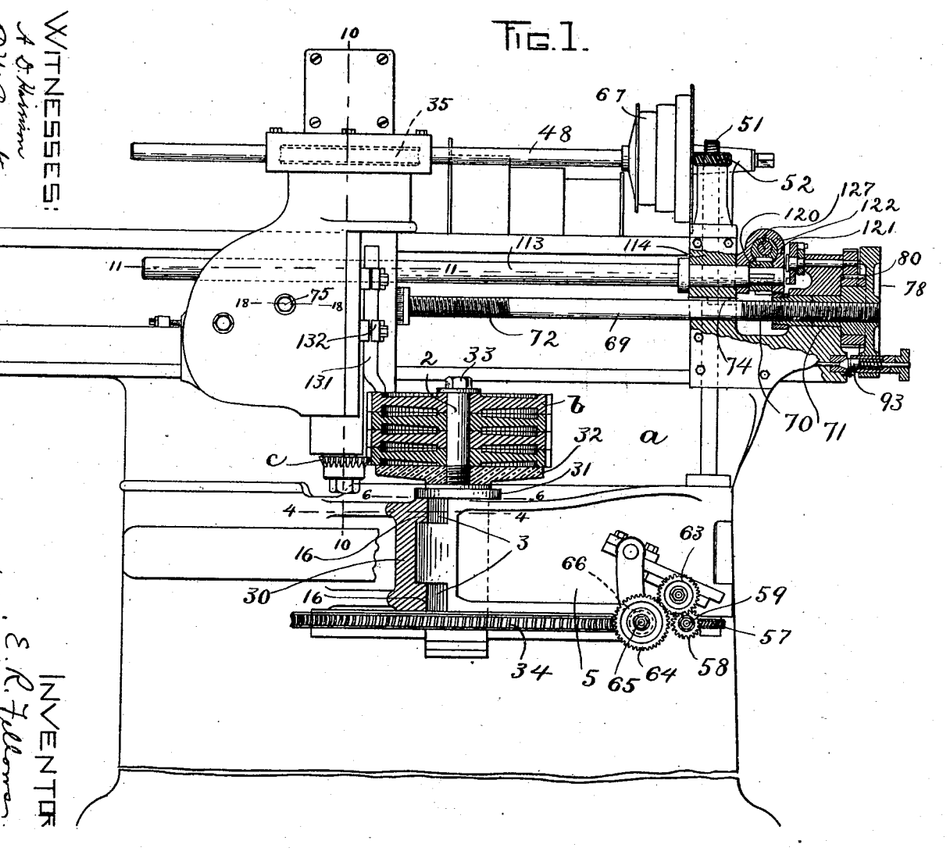
Figure 1 represents a front elevation, Fig. 2 an end elevation, and Fig. 3 a top plan view, of a machine embodying my invention, parts being shown in section in each of said figures.
Figure 2:
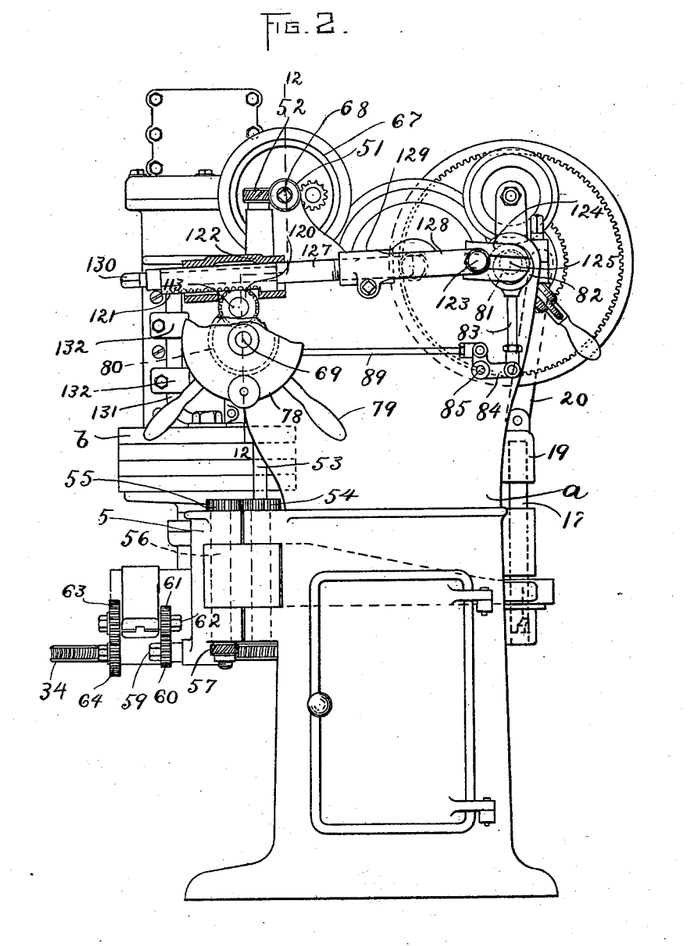
Figure 3:
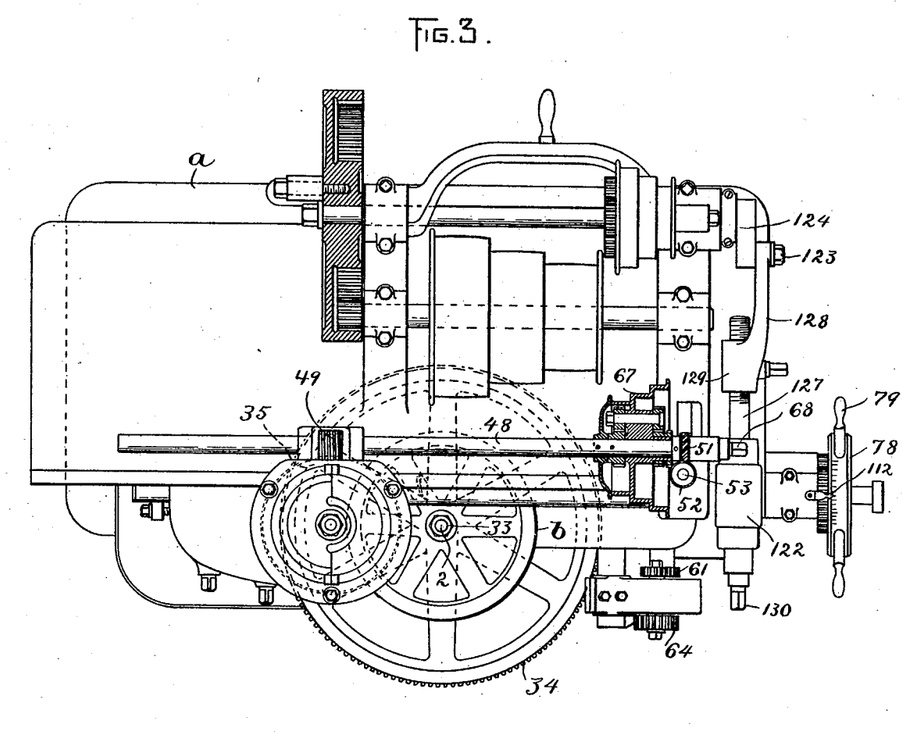

The mechanism employed by me in this embodiment of my invention for imparting the described back-and-forth movement to the carrier is as follows: 17 18 represent two plungers affixed to a head or block 19, which is connected by a pitman 20 with an eccentric wrist-pin 21, mounted on a wheel 22, affixed to the driving-shaft 22', which is continuously rotated, as hereinafter described, and reciprocates the plungers 17 18, which move in suitable guides. The plunger 17 has an incline 23 and the plunger 18 an opposite incline 24, Fig. 8, said inclines coöperating with trundle-rolls 25 26, mounted on the longer arm of the lever 7. When the plungers descend, the incline 23 bears on the trundle 25 and moves the lever in one direction, and when the plungers rise the incline 24 bears on the trundle 26 and moves the lever in the opposite direction. The plungers are provided with vertical faces 27 and 28 above the said inclines, which bear on the trundles and prevent movement of the lever in either direction after the movement by the incline 23 until the incline 24 rises to its operative position. The lever 7 is also utilized to force the quill or bearing 4 at the work-supporting end of the carrier 5 firmly against a seat or abutment 16, formed on a stout arm 30, cast upon the base of the supporting-frame, said seat being formed in two parts, as shown in Fig. 1. The outer end of the carrier 5 is cut away between the parts of said seat, as shown in Fig. 1, to expose the corresponding portions of the quill 4. The seat is substantially semicircular and is formed to accurately fit the exposed portions of the quill when the carrier is at the forward extreme of its movement and presents the work to the cutter, as shown in Fig. 6. The quill is provided with a flange 31 at its upper end, which bears on the top surface of the arm 30, which thus supports the quill against downward pressure due to the weight of the carrier and the work. It will be seen that the work is rigidly supported by the seat or abutment 16 during the cutting operation, so that there is no possibility of the slightest displacement of the work, and thus absolute accuracy in the cutting operation is insured. The lever 7 may be given an additional inward movement to the position shown by dotted lines in Fig. 4 to withdraw the quill from its seat sufficiently to enable the carrier to be swung outwardly from the front of the machine, as shown by dotted lines in the same figure, the carrier swinging loosely on its pivot independently of the lever.

I do not limit myself to a carrier formed as a swinging apron or arm as the means for moving the quill or work-holder toward and from the rigid seat or abutment, and any other suitable means, such as a slide operated by a toggle, may be employed for supporting and moving the work-holder, and any other suitable mechanism may be substituted for the lever 7 for imparting the described movements of engagement and clearance to the carrier.

The oblique movement of engagement and clearance is not necessarily confined to the work-holder, and a machine in which provision is made for imparting this movement to the cutter would be no departure from the spirit of my invention so far as this feature is concerned.

A face-plate 32 is secured to the arbor 2 and spindle 3 to support the work, which may be confined against the face-plate by a nut 33, engaged with the threaded upper end of the arbor. The face-plate is employed when a series of blanks are to be cut simultaneously. In some cases the work may rest on a nut or a loose collar placed on the arbor.

34 represents an index worm-wheel affixed to the work-spindle and connected by positive mechanism, as hereinafter described, with an index-wheel 35 on the cutter-spindle 36, to which the cutter c is affixed. Said spindle 36 is journaled in a movable cutter-slide 37, fitted to reciprocate vertically in a horizontally-movable saddle 38. The slide 37 is reciprocated by mechanism presently described to give the cutter its cutting and return movements. The saddle is adapted to move in the directions required to carry the cutter toward and from the axis of the work, which movement I term the "radial feed," and is fitted to move on guides or gibs 39 40, Fig. 10, on the frame of the machine.

Figure 10:
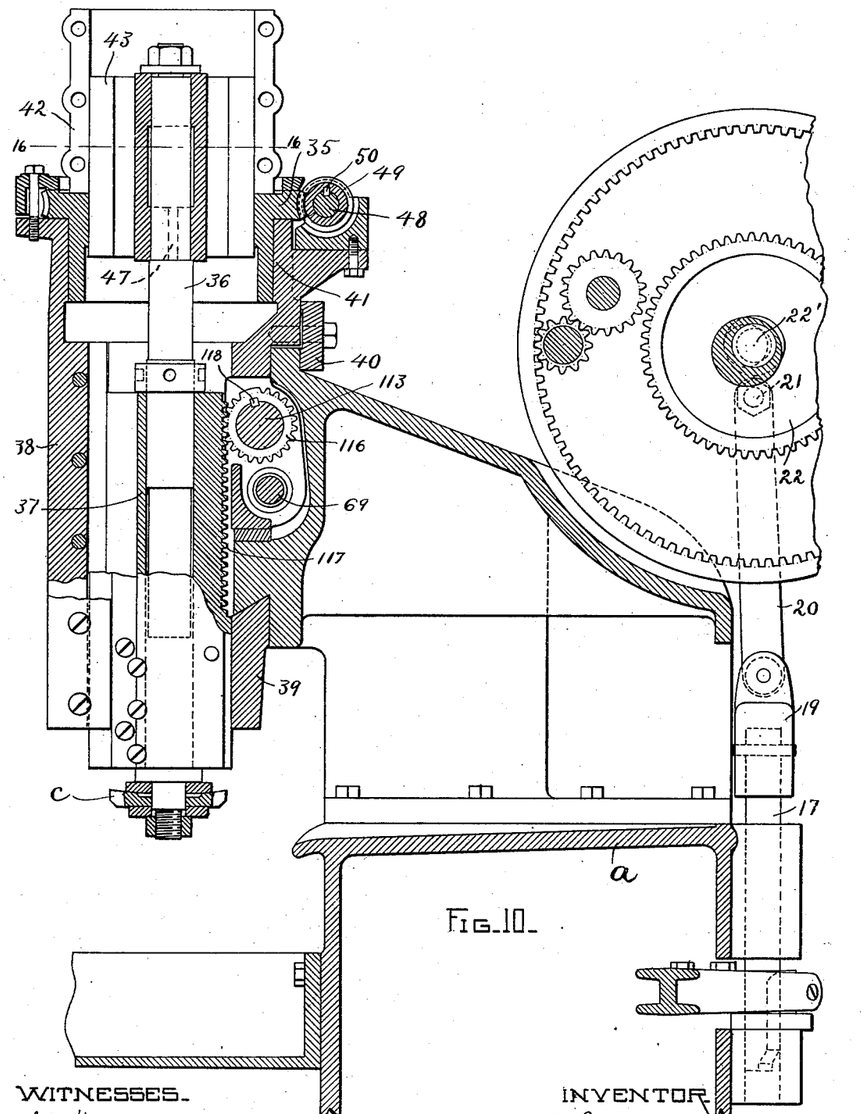
Fig. 10 represents a section on line 10 10, Fig. 1.
Figure 16:
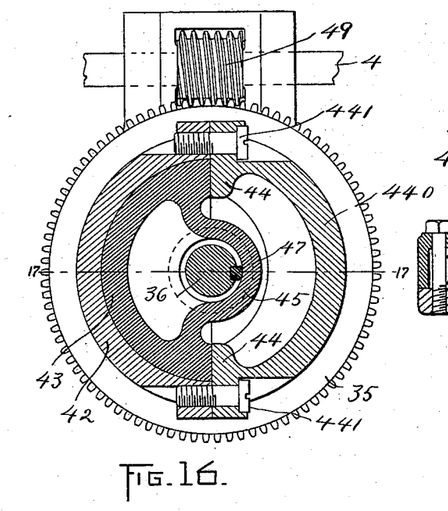
Fig. 16 represents a section on line 16 16, Fig. 10.

The cutter-index 35 is an annular worm-gear fitted to rotate in a bearing 41, Fig. 10, in the upper portion of the saddle 38. The cutter-index is provided with a casing or guide 42, in which is fitted a semicircular slide 43, which is adapted to move vertically in the guide 42 and is caused to rotate with the index-wheel by shoulders or gibs 44 44, Fig. 16, attached to said guide. The slide 43 has a sleeve or bearing 45, which receives the upper portion of the cutter-spindle 46 and is engaged therewith by a key 47, so that the spindle and its index-wheel are rotatively connected, the slide 43 being engaged with the spindle, so that the two move vertically independently of the cutter index-wheel 35. The gibs 44 are formed on a semicircular plate 440, which is attached to the guide 42 by screws 441.

The positive connecting mechanism above referred to between the work index-wheel 34 and the cutter index-wheel 35, which mechanism I term the "rotary feed mechanism," because it simultaneously rotates the cutter and work index-wheels, is as follows: 48 is a horizontal shaft journaled in bearings in the supporting-frame and provided with a worm 49, which meshes with the cutter index-wheel 35 and has a sliding connection with the shaft 48 by means of a spline 50, the worm being contained in a frame or bracket projecting from the saddle, so that the worm moves horizontally with the saddle. A spiral gear-wheel 51 is affixed to the outer end of the shaft 48 and meshes with a spiral gear-wheel 52, affixed to the upper end of a vertical shaft 53, journaled also in the supporting-frame. To the lower end of the shaft 53 is affixed a gear 54, meshing with a gear 55, affixed to a short shaft 56, which is journaled in bearings in the carrier 5, the shaft 56 and gear 55 being arranged so that the gears 54 and 55 will not be separated by the swinging movements of the carrier. A spiral gear 57, affixed to the lower end of the shaft 56, meshes with a spiral gear 58 on a horizontal shaft 59, journaled in a bracket affixed to the carrier 5. A gear 60, affixed to the shaft 59, meshes with a gear 61 on another horizontal shaft 62, journaled in said bracket. To the shaft 62 is affixed a gear 63, meshing with a gear 64 on a horizontal shaft 65, also journaled in the carrier-bracket. The shaft 65 has a worm 66, meshing with the work index-wheel 34. The gears 60, 61, 63, and 64 are change-gears. By thus positively connecting the work and cutter spindles I prevent any appreciable independent rotation of said parts, and thus insure accurate work.

The shaft 48 of the rotary feed mechanism is provided with a cone-pulley 67, which is loose on the shaft 48 and connected therewith through differential gearing hereinafter described. One end of the shaft 48 is provided with a squared shank 68, adapted to be engaged by a key or wrench to enable the rotary feed mechanism to be rotated by hand for the preliminary rotary adjustment of the cutter and work.

Figure 18:
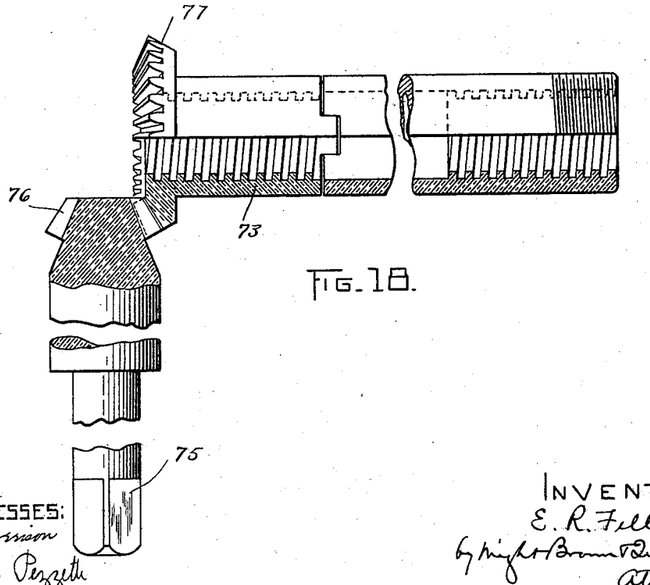
Fig. 18 represents a section on line
75 18 18, Fig. 1.

The saddle carrying the cutter-spindle is moved horizontally by means of a feed-screw 69, which is a horizontal rod or bar having a threaded portion 70, engaged with a nut 71, termed the "radial feed-nut," and another threaded portion 72, engaged with a nut 73, Fig. 18, which is carried by the saddle and is termed the "saddle-nut." The feed-screw is prevented from rotating and permitted to slide lengthwise by a key 74, Fig. 1, on the supporting-frame entering a longitudinal groove in the screw between the two threaded portions. The nuts 71 and 73 are journaled to rotate without moving endwise, the radial feed-nut being contained in a housing in the supporting-frame, while the saddle-nut is contained in a housing in the saddle. The rotation of the saddle-nut while the non-rotating feed-screw is prevented from moving endwise by the radial feed-nut, the latter being stationary, causes a horizontal adjustment of the saddle and enables the operator to move the cutter up to the work before the cutting operation commences. This rotation is effected by means of a stud or shank 75, Fig. 11, journaled in the saddle and squared at its outer end to engage a crank and provided at its inner end with a bevel-gear 76, meshing with a bevel-gear 77, formed on or affixed to the saddle-nut 73. The rotation of the radial feed-nut while the saddle-nut is at rest causes the non-rotating screw 69 to move endwise and move the saddle with it. Provision is made for rotating the radial feed-nut either by hand or by power, the hand rotation moving the cutter away from the work to clear the same after the completion of the cutting operation and toward the work to bring the cutter into operative relation therewith after an uncut blank has been applied to the work-holder, this hand rotation of the radial feed-nut being used only to clear the cutter from and return it to work of a given diameter after the saddle has been given a general adjustment by the rotation of the saddle-nut for work of this diameter, so that no rotation of the saddle-nut is required after the saddle has been adjusted for work of a given diameter until work of a different diameter is introduced. The radial feed-nut is provided with a pilot-wheel 78, which is affixed to the nut and provided with radial handles 79, by which it may be rotated. On the hub of the pilot-wheel is loosely mounted a gear 80, which is continuously rotated by power imparted from the driving-shaft through the following devices, namely: an eccentric 81 on the driving-shaft, a strap 82 on said eccentric, a rod 83, affixed to said strap, a bell-crank lever 84, pivoted at 85 to the supporting-frame and having one of its arms connected with the rod 83, a lever 86, pivoted at 87 to the supporting-frame and carrying on one arm a pawl 88, its other arm being connected by a rod 89 with the bell-crank 84, a ratchet 90, mounted to rotate about the pivot 87 and engaged with the pawl 88, and a pinion 91, affixed to the ratchet and meshing with the gear 80. The pilot-wheel carries a pawl 92, which is adapted to engage the continuously-rotated gear 80, and when so engaged causes the pilot-wheel to rotate with said gear, so that the radial feed-nut 71 is rotated with the continuously-rotated gear 80. This power rotation of the nut produces the radial feed which advances the cutter into the work the required depth before the rotary feed of the cutter and blank commences.

93 is a locking-pin movable in a holder inserted in the pilot-wheel and projected by a spring 94 from the inner side of said wheel. Said pin is adapted to be held in a retracted position by a clutch member 96 on the pin and a complemental clutch member 95 on the wheel, this engagement being effected by drawing the pin outwardly and partly turning it. The locking-pin is provided with a lateral stud 97 near its inner end, which stud is arranged to strike a tripping-pin 98, affixed to the frame of the machine, when the rotation of the pilot-wheel brings the stud and pin together. The contact of the stud 97 with the pin 98 turns the locking-pin sufficiently to disengage the clutch members 95 96, whereupon the spring 94 projects the locking-pin inwardly. This movement of the locking-pin simultaneously produces three results—viz., first, the disengagement of the pawl 92 on the pilot-wheel from the continuously-rotating gear 80 by means of a pin 99, which slides in the pilot-wheel beside the locking-pin and has an inclined inner end which strikes the tail of the ratchet 92 and displaces the latter, said pin 99 being held by a light spring 100 in contact with the head of the locking-pin; secondly, the locking of the pilot-wheel and the radial feed-nut by the entrance of the locking-pin into a socket or bushing 101 in the supporting-frame, and, thirdly, the engagement of the rotary feed-cone 67 with the shaft 48 of the positive rotary feed mechanism. This last result is accomplished as follows: The rotary feed of the cutter and work is produced, as already described, by the simultaneous rotation of the cutter and work index-wheels 34 35 through the said positive rotary feed mechanism, the relative rate of rotation of said parts being determined by the proportion of the diameter of the cutter to the diameter of the work to be cut. The speed of the rotary feed-cone 67 is much higher than the desired or necessary speed of the shaft 48, with which it is connected, and the speed of said shaft is therefore reduced through the medium of the differential gearing within the feed-cone. This gearing comprises the gears 102 103 104, each having the same number of teeth—say twenty-three—and another gear 105, having one tooth less—say twenty-two. The gears 102 and 105 are mounted on a shaft 106, journaled in the feed-cone, and have a planetary motion around the gears 103 and 104, one of which—the gear 103—is affixed to the shaft 48 and meshes with the gear 102, while the other, 104, rotates loosely on said shaft and meshes with the gear 105.

107 is a ratchet, which is affixed to the loose gear 104 and rotates therewith.

108 is a pin which slides in guides on the supporting-frame and is normally held by a spring 199 in engagement with the loose ratchet 107, and when so held prevents the said ratchet and the gear 104 from rotating, thus causing the series of gears to coöperate in giving the rotary feed-shaft 48 a fractional part of a rotation (one twenty-second in this case) to each complete rotation of the feed-cone 67. When the pin 108 is withdrawn from engagement with the ratchet 107, the latter and the gear 104 are loose and the rotation of the feed-shaft ceases.

Figures 7, 12, 13, 14, 15:
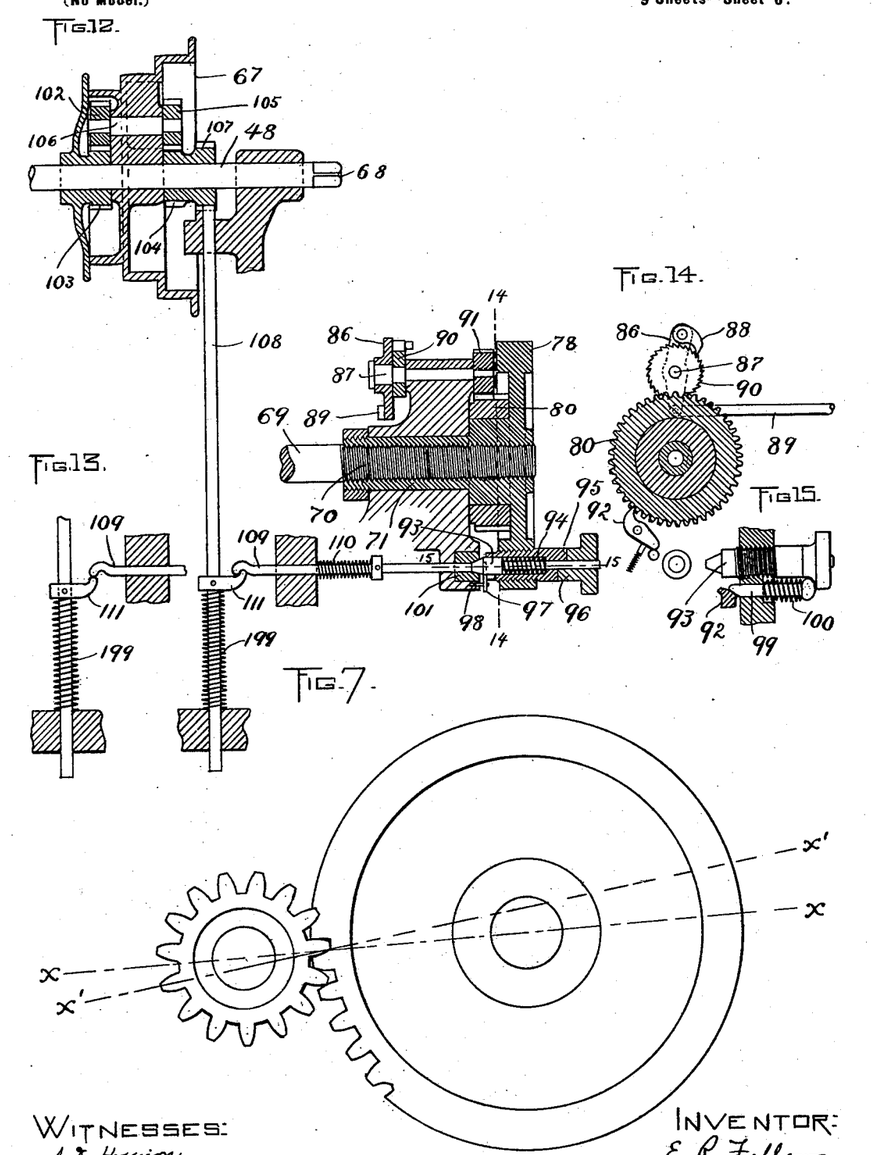

During the radial feed of the cutter caused by the rotation of the radial feed-nut, as above described, the pin 108 is held out of engagement with the ratchet 107 to make the rotary feed inoperative by a trigger-rod 109, which slides in guides in the supporting-frame and is normally projected by a spring 110 into the socket or bushing 101, said spring being weaker than the spring 94, which projects the locking-pin into said socket. The trigger-rod when in this position engages an arm 111 on the pin 108, as shown in Fig. 13, and holds the pin out of engagement with the ratchet 107. When the locking-pin enters the socket 101, as above described, it displaces the trigger-rod and causes it to release the pin 108, whereupon said pin engages the ratchet and makes the rotary feed mechanism operative, as described. It will be seen, therefore, that the radial feed of the cutter is automatically stopped and the rotary feed of the cutter and work is automatically started when the locking-pin on the pilot-wheel reaches the socket or bushing, the extent of the radial feed for the desired pitch or depth of tooth being determined by the distance the locking-pin has to move before reaching the socket or bushing. This distance may be determined by a suitable fixed pointer 112, coöperating with marks or graduations on the periphery of the pilot-wheel, the latter being turned backwardly by hand before the radial feed operation to any desired point. I do not limit myself, however, to the independent or successive operation of the radial and rotary feed mechanisms and may organize the machine so that both mechanisms will be operated simultaneously.

Figure 11:
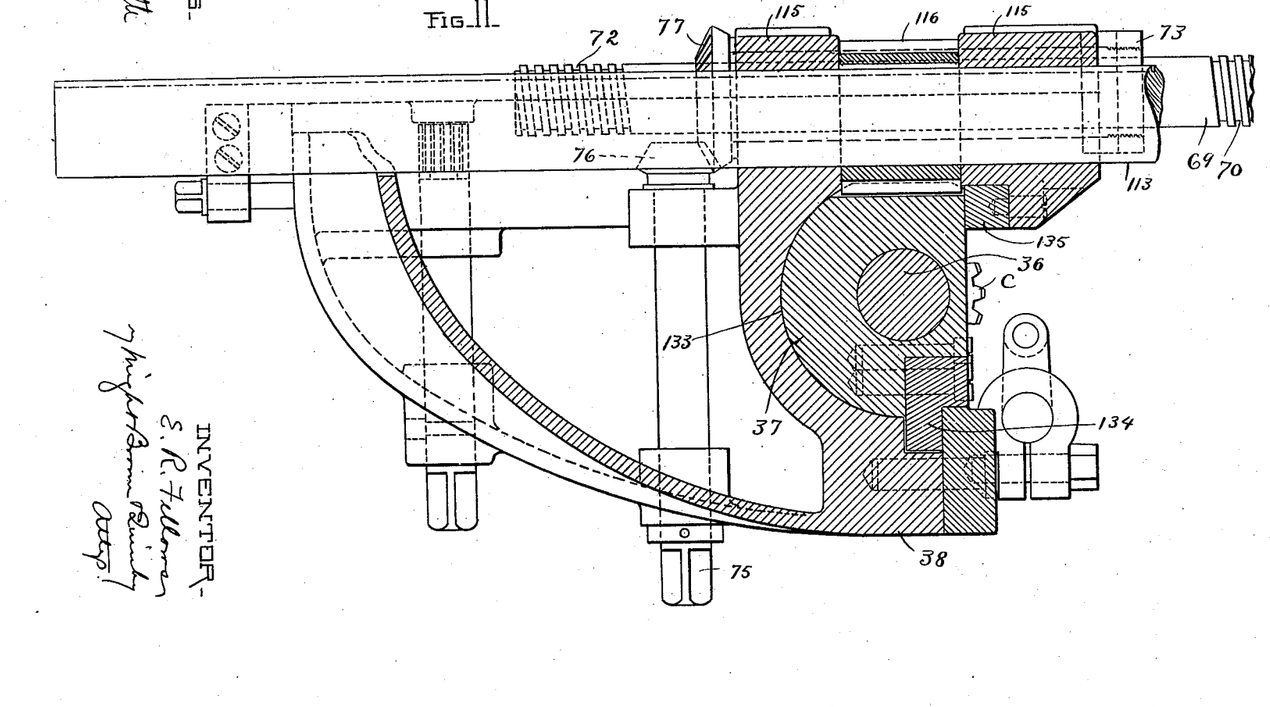

The cutter-slide 37 is reciprocated to give the cutter its cutting and return movements by the following means: 113 represents a horizontal rock-shaft which is journaled in a bearing 114, Fig. 1, in the supporting-frame and in bearings 115, Fig. 11, on the saddle, the last-mentioned bearings being adapted to slide on the rock-shaft. 116 represents a pinion meshing with rack-teeth 117, formed on the cutter-slide, said pinion being located between the bearings 115 and having a sliding and rotative connection with the rock-shaft by means of a spline 118, entering a groove in the rock-shaft. To one end of the rock-shaft 113 is affixed a pinion 120, meshing with rack-teeth on a rack-bar 121, which is reciprocated in a guide 122, mounted to oscillate on the rock-shaft 113. The rack-bar 121 is connected by a rod with an adjustable wrist-pin 123 on a crank-arm 124, affixed to the driving-shaft. The crank-arm has a slot or guide 125, in which the wrist-pin is adjustable toward and from the axis of the driving-shaft to give the rack-bar any desired length of stroke, the movement of the rack-bar being imparted by the rock-shaft to the cutter-slide 37, so that the cutter may be given a length of up-and-down movement proportioned to the thickness of the blank or series of blanks to be cut.

Each adjustment of the wrist-pin to vary the length of stroke of the cutter changes the longitudinal position of the rack-bar and the vertical position or height of the cutter, so that the position of the cutter when at its starting-point may be too high or too low relatively to the work. To compensate for this change and to bring the starting-point of the cutter into the desired relation to the work, I provide means for longitudinally adjusting the rack-bar 121. This is preferably accomplished by making the connecting-rod which connects the rack-bar with the wrist-pin 123 in two sections 127 128, one having a tapped socket 129, engaging a screw-thread on the other. The section 127 passes through the rack-bar and is adapted to rotate therein. Said section has shoulders bearing on the ends of the rack-bar, and its outer end is squared at 130 to engage a crank or wrench, whereby the section 127 may be turned to adjust the rack-bar and cutter.

I prefer to arrange the cutter so that it will cut during its upward or drawing stroke, thus causing the saddle to support the cutting strains and relieving the work-holder from said strains. I have therefore provided the saddle with a work-supporting post or bar 131, which may be adjustably secured to the saddle by means of clamps 132 or otherwise, its lower end bearing on the work, as shown in Fig. 1. The saddle is compact and has a relatively short projection from the supporting-frame, and since it does not move to give the cutter its movements of clearance and engagement its construction may be as solid and substantial as may be required to enable it to adequately support the cutting strains. The work-holder and its carrier may therefore be made relatively light, so that the movements of clearance and engagement may be effected with the minimum expenditure of power.

Figure 17:
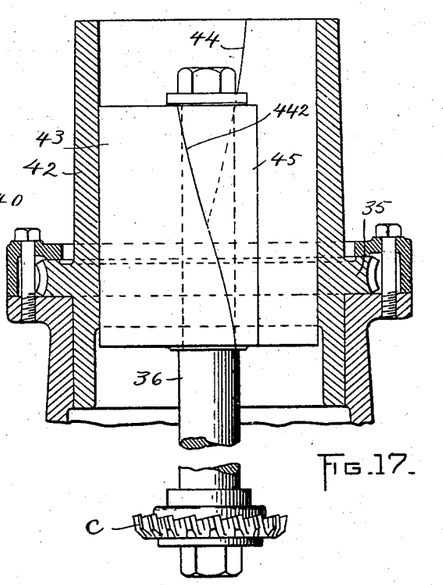
Fig. 17 represents a section on line 17 17, Fig. 16.

The saddle 38 is provided with a semicircular seat 133, Fig. 11, and with gibs 134 135 at opposite sides of said seat. The cutter-slide has a substantially semicircular face, which is held to the said seat by said gibs. This form makes the saddle and cutter-slide strong and compact and enables the cutter-spindle to be located close to the supporting-frame. It also enables the cutter to enter the lower portion of the saddle during its upward movement, so that the projection of the cutter below the slide and saddle is reduced to the minimum. In Fig. 17 I show the gibs 44 and the faces 442 of the slide 43 formed with a helical pitch or inclination, so that the slide, cutter-spindle, and cutter are partly rotated when the spindle is moved endwise, the cutter $c$ being thus given a helical movement. The sides of the teeth of the cutter are correspondingly inclined, so that teeth of helical form are generated on the blank.

It will be seen that several of the improvements herein described and claimed are applicable to a machine organized to generate rack-teeth on a straight bar. In my above-mentioned patent I have shown in Figs. 1, 2, 3, 4, and 8 a slide having a rectilinear movement in a fixed guide arranged to support a rack-blank and present it to the cutter, the slide being movable progressively to feed the rack-blank and the operation of generating a series of rack-teeth being practically the same as that of generating gear-teeth, the only difference being a rectilinear instead of a rotary movement of the blank. In the present case the rack-blank slide must be attached to the swinging apron or carrier 5, so that the rack-blank will receive the above-described movement of engagement and clearance.

Having thus explained the nature of my invention and described a way of constructing and using the same, although without having attempted to set forth all the forms in which it may be embodied or all the modes of its use, I declare that what I claim is—

1. A gear-generating machine comprising a cutter having a circular series of radiating gear-shaped metal-planing teeth, a blank holder or support, means for reciprocating one of said parts to cause the cutter to plane the blank, means for changing the relative positions of said parts to cause the teeth to act successively at different points on the blank and generate the curves of gear-teeth thereon, and means for giving said parts a relative movement of engagement and clearance on a line which is oblique to a line connecting their axes.

2. A gear-generating machine comprising a reciprocating rotary cutter having a circular series of radiating gear-shaped metal-planing teeth, a rotary work-holder, means for rotating the cutter and work-holder in unison, and means for giving said parts a relative movement of engagement and clearance on a line which is oblique to a line connecting their axes.

3. A gear-generating machine comprising a reciprocating rotary cutter, a rotary work-holder, mounted with its axis parallel to the axis of the cutter, means to give the cutter an axial cutting movement, means for rotating the cutter and work-holder in unison, and means for giving the work-holder and cutter a relative movement of engagement and clearance in a direction which is oblique to a line connecting the axes of said cutter and work-holder.

4. A gear-generating machine comprising a reciprocating rotary cutter, a rotary work-holder, mounted with its axis parallel to the axis of the cutter, means to give the cutter an axial cutting movement, means for rotating the cutter and work-holder, in unison, means for giving one of said parts a movement of engagement and clearance, and a guide for the said part, which is oblique to a line connecting the axis of the cutter and work-holder.

5. A gear-generating machine comprising a reciprocating rotary cutter, a rotary work-holder, means for rotating the cutter and work-holder in unison, means for moving the work-holder toward and from the cutter, a fixed guide for the work-holder which is oblique to a line connecting the axes of the cutter and work-holder, and means for pressing the work-holder against said guide.

6. A gear-generating machine comprising a reciprocating rotary cutter, a rotary work-holder, means for rotating the cutter and work-holder in unison, means for moving the work-holder toward and from the cutter, in a direction substantially normal thereto, and a fixed seat or abutment formed to engage and support the work-holder when the latter is in its position of nearest approach to the cutter.

7. A gear-generating machine comprising a reciprocating rotary cutter, a rotary work-holder, means for rotating the cutter and work-holder in unison, a carrier for the work-holder having provisions for moving the work-holder toward and from the cutter and for swinging the work-holder outwardly and inwardly from its operative position, and a rigid seat or abutment which engages and supports the holder when the latter is in its operative position.

8. A gear-generating machine comprising a reciprocating rotary cutter, a two-armed lever fulcrumed on the supporting-frame, a carrier pivoted to the shorter arm of said lever, a work-holder supported by the outer end of said carrier, means for applying power to the longer arm of the lever to oscillate the same and impart a movement of engagement and clearance to the carrier and work-holder, and a fixed seat or abutment arranged to support the work-holder when it is in its position of engagement.

9. The combination of the fixed arm 30 on the supporting-frame having the two-part seat 16, the movable carrier socketed at one end and cut away to expose portions of the socket, a spindle-holding quill inserted in said socket and exposed to contact with the parts of the seat 16 by the cut-away portions of the carrier, said quill having a flange formed to bear on the top of the arm 30, and means for moving the said carrier and quill toward and from the seat.

10. The combination of the rotary cutter, a swinging work-carrier having a rotary work-holder, a fixed guide which is oblique to a line connecting the axes of the cutter and work-holder, a lever 13 movable endwise with the carrier and laterally movable independently thereof, a fixed fulcrum 15 on which said lever has a sliding movement, a loose connection such as the belt 14, between the lever and the carrier, and a spring which moves with the carrier and presses the lever toward the oblique guide.

11. A gear-generating machine comprising a rotary gear-shaped cutter, which planes by an axial movement, means to reciprocate said cutter axially, a rotary work-holder, index-wheels connected with said cutter and work-holder, and a system of shafts and gears positively connecting said index-wheels.

12. A gear-generating machine comprising a rotary work-holder, a cutter saddle or carriage movable radially toward and from the work-holder, a cutter-slide movable in a direction parallel with the axis of the work-holder, a cutter-spindle adapted to rotate in and movable with said slide, a cutter index-wheel journaled on the saddle, means for rotatively connecting the said index-wheel and the spindle, said means having provision for permitting longitudinal movements of the spindle, an index-wheel affixed to the work-holder, a feed-shaft 48, a worm having a sliding and a rotative engagement with said feed-shaft and meshing with the cutter-index, and a system of shafts and gears positively connecting said feed-shaft with the work-holder index-wheel.

13. The combination of the cutter saddle or carriage, the cutter index-wheel journaled thereon and provided with a vertical guide, the slide movable vertically in said guide and rotatively connected therewith, the cutter-slide movable vertically in the saddle, and the cutter-spindle journaled in the slide and movable vertically therewith and having a rotative connection with the said slide.

14. The combination of the cutter saddle or carriage having a semicircular seat and gibs at opposite edges of said seat, the cutter-slide of substantially semicircular form in cross-section fitted to said seat and gibs, and the cutter-spindle journaled in said slide.

15. In a gear-generating machine, the combination of a work-holder, a gear-shaped planing-cutter, means to impart a reciprocating cutting movement to said cutter relative to the work, means to impart two kinds of feed movement to said cutter relatively to the work-holder, namely, a radial inward feed toward the work to attain the required tooth depth, and a relative feed of the cutter and work equivalent to the movement of intermeshing gears, and automatically-acting mechanism to render the radial feeding means inoperative after a predetermined inward movement of the cutter.

16. The combination of a rotary cutter, a rotary work-holder, a rotary feed mechanism for rotating the cutter and work-holder in unison, means for making the rotary feed mechanism temporarily inoperative, and automatic means for making said mechanism operative.

17. In a gear-generating machine, the combination of a work-holder, a gear-shaped planing-cutter, means to impart a reciprocating cutting movement to said cutter relative to the work, means to impart two kinds of feed movement to said cutter relatively to the work-holder, namely, a radial inward feed toward the work to attain the required tooth depth and a relative feed of the cutter and work equivalent to the movement of intermeshing gears, and means to automatically produce said feed movements in succession.

18. The combination of the cutter saddle or carriage, the longitudinally-movable feed-screw engaged with the saddle, means for preventing the rotation of said feed-screw, the radial feed-nut journaled to rotate without moving endwise and engaged with the feed-screw, the rotation of said nut causing endwise movement of the screw and a radial feed movement of the carriage, adjustable mechanism for imparting rotary movement of any desired extent to the said feed-nut, and automatic means for stopping the rotation of said nut.

19. The combination of the cutter saddle or carriage, the saddle-nut journaled therein, the longitudinally-movable non-rotating feed-screw engaged with the saddle-nut, and the radial feed-nut journaled in the supporting-frame and engaged with the feed-screw, said saddle-nut and the radial feed-nut being independently rotatable.

20. The combination of the cutter saddle or carriage, the saddle-nut journaled therein, means carried by the saddle for rotating the saddle-nut, the longitudinally-movable non-rotating feed-screw engaged with the saddle-nut, the radial feed-nut journaled in the supporting-frame and engaged with the feed-screw, and means for independently rotating the radial feed-nut.

21. The combination of the cutter saddle or carriage, the longitudinally-movable non-rotating feed-screw engaged therewith, the radial feed-nut journaled in the supporting-frame, the pilot-wheel engaged with the radial feed-nut, and mechanism to automatically rotate said pilot-wheel and feed-nut to feed the cutter into the work.

22. The combination of the cutter saddle or carriage, the radial feed mechanism including the non-rotating feed-screw engaged therewith, the radial feed-nut and mechanism for rotating said nut, the rotary cutter carried by the saddle, the rotary work-holder, the rotary feed mechanism including the feed-shaft 48, a feed cone or pulley on said shaft, differential gearing substantially as described, connecting said pulley and shaft and having provisions for being made temporarily inoperative, and mechanism operated by the rotation of the radial feed-nut for locking said nut and thus stopping the radial feed and at the same time making the rotary feed mechanism operative.

23. The combination of the rotary cutter, the cutter saddle or carriage, the rotary work-holder, the cutter and work index-wheels, the positive rotary-feed-connecting mechanism between said wheels, said mechanism including the feed-shaft 48, the longitudinally-movable non-rotating feed-screw engaged with said carriage, the radial feed-nut engaged with said screw, the pilot-wheel affixed to said nut, the feed cone or pulley on the said feed-shaft, differential gearing connecting the said pulley and shaft, said gearing including a loose gear 104, a locking device which normally holds said loose gear from rotating and thus makes the said differential gearing operative to impart a reduced speed from the pulley to the shaft 48, a detent such as the rod 109 adapted to hold said locking device out of its normal position, thus making the differential gearing inoperative, a gear continuously rotated by power on the hub of the pilot-wheel, a pawl on the pilot-wheel normally engaging said gear, a spring-pressed locking-bolt on the pilot-wheel adapted to be set in a retracted position, and means for releasing said locking-bolt when it reaches a predetermined position, said bolt acting to disconnect the pilot-wheel from the continuously-rotating gear to lock the pilot-wheel and radial feed-nut and to displace said detent 109, thereby making the differential gearing operative.

24. The combination of a cutter saddle or carriage, a cutter-slide reciprocated longitudinally therein, a rotary cutter-spindle carrier by said slide, a rotary work-holder, and a work-support mounted on said carriage and arranged to support the work against the operative movement of the cutter, and means for adjusting said work-support to the thickness of the work.

25. The combination of the cutter saddle or carriage, the cutter-slide carried thereby and provided with a rack, the rotary cutter-spindle journaled in the slide, the driving-shaft having a crank, the rock-shaft having a sliding pinion meshing with the said rack, and a rack-bar connected with the crank and engaged with the rock-shaft.

26. The combination of the cutter saddle or carriage, the cutter-slide carried thereby and provided with a rack, the rotary cutter-spindle journaled in the slide, the driving-shaft having a crank, the rock-shaft having a sliding pinion meshing with the said rack, a rack-bar engaged with the rock-shaft, and a connection between said rack-bar and crank having provisions for adjusting the rack-bar longitudinally and thereby varying the initial position of the cutter-slide.

27. The combination of the cutter saddle or carriage, the cutter-slide carried thereby and provided with a rack, the rotary cutter-spindle journaled in the slide, the driving-shaft having a crank, the rock-shaft having a sliding pinion meshing with the said rack, a rack-bar engaged with the rock-shaft, and a two-part or telescopic connecting-rod connecting the rack-bar with the crank, one part of said rod being engaged with the rack-bar and having a screw-thread connection with the other part.

28. The combination of the cutter saddle or carriage, the cutter index-wheel journaled thereon and provided with a vertical semicircular guide 42, and helically-inclined shoulders or gibs at opposite edges of said guide, the slide movable vertically in said guide and having helically-inclined faces coöperating with said gibs in giving the slide a partial rotation when it is moved vertically, the cutter-spindle journaled in the slide and movable vertically therewith, the cutter and slide being rotatively connected, the gear-shaped cutter having the sides of its teeth helically inclined, and means for reciprocating the spindle and slide in the carriage.

29. A gear-generating machine, comprising a gear-shaped cutter, having its teeth helically inclined, a blank holder or support, means for rotating the cutter and work-holder in unison, means for reciprocating one of said parts to cause the cutter to plane the blank, and means for imparting a partial rotation of said part during its reciprocation.

In testimony whereof I have affixed my signature in presence of two witnesses.

EDWIN R. FELLOWS.

Witnesses:
M. S. SWEET,
E. J. FULLAM.